United States Patent
Wang

(10) Patent No.: US 10,667,306 B2
(45) Date of Patent: May 26, 2020

(54) BSSID UPDATING

(71) Applicant: NEW H3C TECHNOLOGIES CO., LTD., Hangzhou (CN)

(72) Inventor: Fei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/076,740

(22) PCT Filed: Feb. 21, 2017

(86) PCT No.: PCT/CN2017/074280
§ 371 (c)(1),
(2) Date: Aug. 9, 2018

(87) PCT Pub. No.: WO2017/143968
PCT Pub. Date: Aug. 31, 2017

(65) Prior Publication Data
US 2019/0053299 A1 Feb. 14, 2019

(30) Foreign Application Priority Data
Feb. 26, 2016 (CN) .......................... 2016 1 0108633

(51) Int. Cl.
*H04W 76/18* (2018.01)
*H04W 76/11* (2018.01)
(Continued)

(52) U.S. Cl.
CPC ............ *H04W 76/11* (2018.02); *H04W 48/10* (2013.01); *H04W 76/10* (2018.02); *H04W 76/18* (2018.02); *H04W 88/14* (2013.01); *H04W 84/12* (2013.01)

(58) Field of Classification Search
CPC ..... H04W 76/11; H04W 76/18; H04W 48/10; H04W 88/14; H04W 76/10; H04W 84/12
See application file for complete search history.

(56) References Cited

U.S. PATENT DOCUMENTS

2007/0081477 A1 4/2007 Jakkahalli et al.
2009/0109870 A1* 4/2009 Metke ................ H04L 45/46
                                                370/254
(Continued)

FOREIGN PATENT DOCUMENTS

CN       103167471 A       6/2013
CN       103581901 A       2/2014
(Continued)

OTHER PUBLICATIONS

ISA State Intellectual Property Office of the People's Republic of China, Written Opinion of the International Searching Authority Issued in Application No. PCT/CN2017/074280, dated May 26, 2017, WIPO, 6 pages.
(Continued)

*Primary Examiner* — Chi H Pham
*Assistant Examiner* — Fahmida S Chowdhury
(74) *Attorney, Agent, or Firm* — McCoy Russell LLP

(57) ABSTRACT

In an example, a method of updating Basic Service Set ID (BSSID) is provided. According to the method, a wireless bridge device determines whether a Service Set Identifier (SSID) carried in a received access packet transmitted by a first wireless access point is matched with a target SSID locally saved in the wireless bridge device. The wireless bridge device continues determining whether a BSSID carried in the access packet is identical to a locally saved target BSSID if the decision result is yes. Otherwise, the wireless bridge device determines whether the access packet carries configuration information of a second wireless access point currently associated with the wireless bridge device, and the wireless bridge device saves the BSSID carried in the access packet as the target BSSID if the access packet carries the configuration information.

7 Claims, 7 Drawing Sheets

(51) Int. Cl.
*H04W 76/10* (2018.01)
*H04W 48/10* (2009.01)
*H04W 88/14* (2009.01)
*H04W 84/12* (2009.01)

(56) References Cited

U.S. PATENT DOCUMENTS

| | | | |
|---|---|---|---|
| 2012/0039329 A1* | 2/2012 | Sun | H04B 1/1027 370/345 |
| 2015/0350993 A1 | 12/2015 | Kasten et al. | |
| 2018/0042050 A1* | 2/2018 | Kim | H04W 74/0825 |

FOREIGN PATENT DOCUMENTS

| | | |
|---|---|---|
| CN | 103929831 A | 7/2014 |
| CN | 104302015 A | 1/2015 |
| EP | 2770701 A1 | 8/2014 |
| JP | 2003274454 A | 9/2003 |
| JP | 2006352188 A | 12/2006 |
| JP | 2007135146 A | 5/2007 |
| JP | 2008072402 A | 3/2008 |
| JP | 2013074579 A | 4/2013 |
| JP | 2014158255 A | 8/2014 |
| JP | 2014212497 A | 11/2014 |
| JP | 2015002412 A | 1/2015 |
| WO | 2005081460 A1 | 9/2005 |
| WO | 2009055249 A1 | 4/2009 |
| WO | 2011118100 A1 | 9/2011 |

OTHER PUBLICATIONS

European Patent Office, Extended European Search Report Issued in Application No. 17755797.2, dated Jan. 30, 2019, Germany, 7 pages.
ISA State Intellectual Property Office of the People's Republic of China, International Search Report Issued in Application No. PCT/CN2017/074280, dated May 26, 2017, WIPO, 4 pages.
Japanese Patent Office, Office Action Issued in Application No. 2018-544862, dated Aug. 6, 2019, 10 pages. (Submitted with Machine Translation).
State Intellectual Property Office of the People's Republic of China, Office Action and Search Report Issued in Application No. 201610108633.3, dated Jan. 2, 2020, 13 pages. (Submitted with Machine Translation).
Japanese Patent Office, Office Action Issued in Application No. 2018-544862, dated Mar. 24, 2020, 10 pages. (Submitted with Machine Translation).

* cited by examiner

BSSID UPDATING

CROSS REFERENCE TO RELATED APPLICATIONS

The present application is a U.S. National Phase of International Patent Application Serial No. PCT/CN2017/074280 entitled "BASIC SERVICE SET IDENTIFIER (BSSID) UPDATING," filed on Feb. 21, 2017. International Patent Application Serial No. PCT/CN2017/074280 claims priority to Chinese Patent Application No. 201610108633.3, filed on Feb. 26, 2016. The entire contents of each of the above-cited applications are hereby incorporated by reference in their entirety for all purposes.

BACKGROUND

Wireless hotspots coverage on different regions may be achieved by deploying wireless access points by Operators. Users may access network resources by accessing wireless bridge devices to the wireless access points of the regions. However, during the network accessing, the wireless access points being accessed to may malfunction so as to cause the network access failure. The malfunctioning wireless access point may be replaced, and then Basic Service Set IDs (BSSIDs) of all wireless bridge devices accessed to the malfunctioning wireless access point may be changed, wherein the BSSID may be interpreted in wireless meaning as a Medial Access Control (MAC) address. The wireless bridge devices may access to the wireless access point by associating with the BSSID of the wireless access point.

A manner for changing the BSSID of the wireless bridge device accessed to the malfunctioning wireless access point may be as below: first of all, all the wireless bridge devices accessed to the malfunctioning wireless access point may be determined, then the BSSID of the malfunctioning wireless access point associated with each of the wireless bridge devices may be manually changed into a BSSID of a new wireless access point replacing the malfunctioning wireless access point, namely, the BSSID of the new wireless access point may be reassociated so that the wireless bridge device may be accessed to the new wireless access point.

DETAILED DESCRIPTION OF THE EMBODIMENTS

The following will clearly and completely describe the technical solutions in the examples of the present disclosure with reference to the accompanying drawings in the examples of the present disclosure.

The examples of the present disclosure may provide a method and an apparatus for updating a BSSID and connecting a network to automatically update an associated BSSID without manual intervention and reduce maintenance workload.

It is to be noted that the method of updating a BSSID provided by the examples of the present disclosure may be applied to a wireless bridge device, wherein, the wireless bridge device may be a wireless bridge, for example. The wireless bridge device may access to a wireless access point by associating the BSSID of the wireless access point, and then may connect a network via the wireless access point. The wireless bridge device may locally store a BSSID, a service set identifier (SSID) and configuration information of a latest associated wireless access point. The configuration information may include an ID (source ID) of a manufacturer of the wireless access point, last three bytes (address ID) of the BSSID and the BSSID. The SSID may be regarded as a name of a local area network (LAN). According to a technology about SSID, a wireless LAN may be divided into a plurality of subnetworks requiring different authentications, and only authenticated users may be permitted to access to a corresponding subnetwork. In this way, unauthenticated users may be prevented from accessing to the network.

Figure 1:
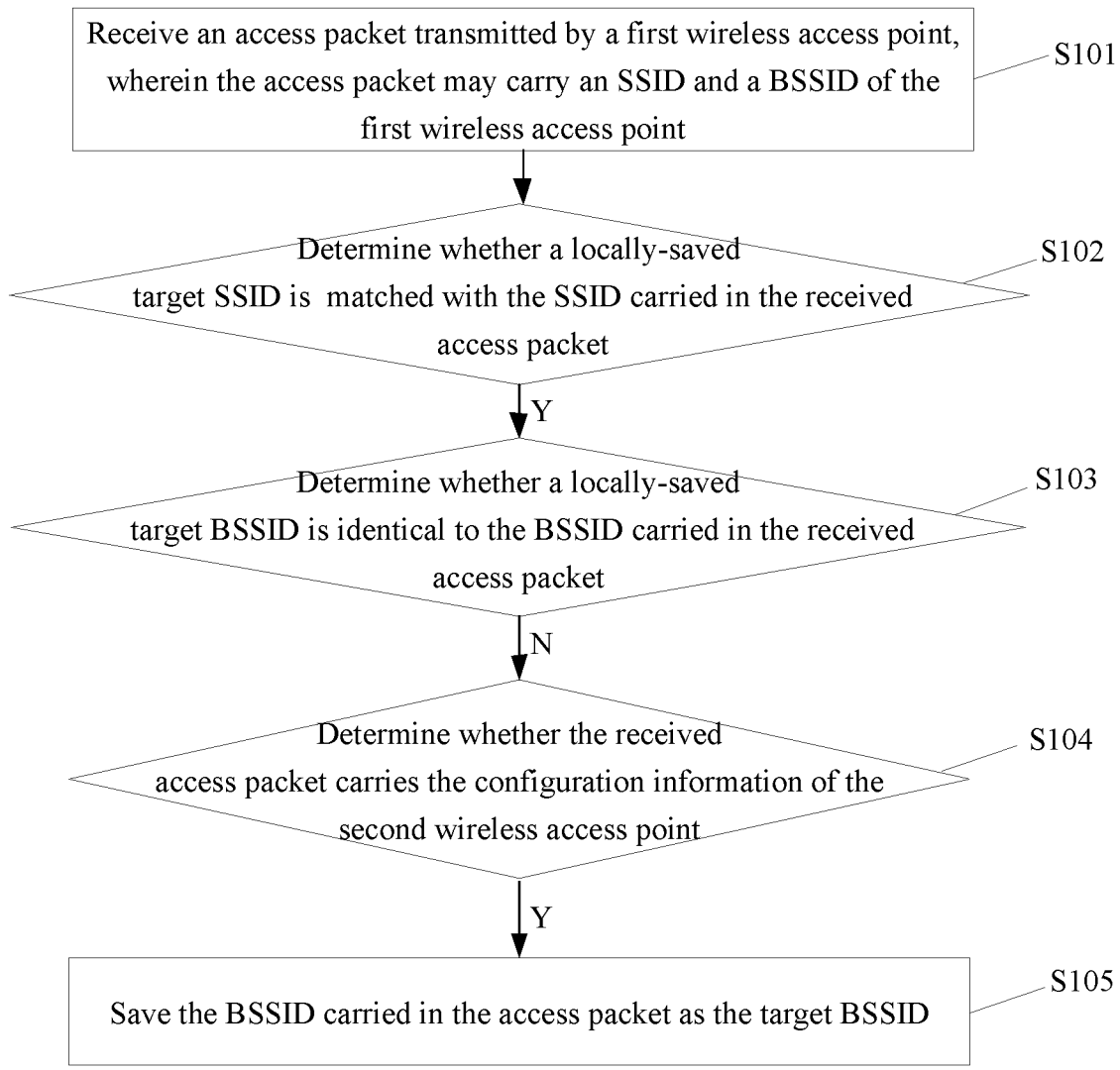
FIG. 1 is a schematic flow diagram of a method of updating a BSSID according to examples of the present disclosure.

As shown in FIG. 1, a method of updating a BSSID provided in the examples of the present disclosure may be applied to a wireless bridge device and may include following blocks.

At block S101, the wireless bridge device may receive an access packet transmitted by a first wireless access point, wherein the access packet may carry an SSID and a BSSID of the first wireless access point.

It is to be understood that after being disconnected from an associated second wireless access point, the wireless bridge device may enter into an active scanning stage. In the active scanning stage, the wireless bridge device may actively receive an access packet transmitted by the first wireless access point. The access packet transmitted by the first wireless access point may carry the SSID and the BSSID of the first wireless access point. Of course the wireless bridge device may simultaneously receive access packets transmitted by a plurality of wireless access point by means of active scanning. After receiving the access packet transmitted by the first wireless access point, the wireless bridge device may analyze the access packet to determine the SSID and the BSSID of the first wireless access point. The access packet may be analyzed by the prior art, which is not unnecessarily described herein. Specifically, the access packet may be a beacon packet belonging to a management frame.

At block S102, the wireless bridge device may determine whether a locally-saved target SSID is matched with the SSID carried in the received access packet, and block S103 may be executed if the decision result is yes.

Specifically, after receiving the access packet transmitted by the first wireless access point, the wireless bridge device may analyze the SSID carried in the access packet transmitted by the first wireless access point, and determine whether the target SSID locally saved in the wireless bridge device is matched with the SSID carried in the access packet. The target SSID may be the SSID of the second wireless access point currently associated with the wireless bridge device. The wireless bridge device may discard an access packet carrying an SSID not matched with the locally-saved target SSID, and may continue analyzing an access packet matched with the target SSID.

At block S103, the wireless bridge device may determine whether a locally-saved target BSSID is identical to the BSSID carried in the received access packet, and block S104 may be executed if they are determined not identical.

It is to be noted that in practical application, there may be many cases where the wireless bridge device may be disconnected from the associated second wireless access point. One case may be abnormal disconnection, for example, the second wireless access point may be removed in case of a fault, which may cause a network connection between the wireless bridge device and the second wireless access point to be disconnected. Another case may be normal disconnection, for example, a circuit disconnection (power outage or the like) may cause the network connection between the wireless bridge device and the second wireless access point to be disconnected, and so on.

After it is determined that the SSID carried in the access packet is matched with the target SSID locally saved in the wireless bridge device, the BSSID of the first wireless access point may be analyzed from the access packet, and it may be determined whether the BSSID is identical to the target BSSID locally saved in the wireless bridge device, wherein the target BSSID may be the BSSID of the second wireless access point. If they are identical, it may be determined that the access packet is the access packet transmitted by the associated second wireless access point. For example, when a circuit between the wireless bridge device and the second wireless access point is disconnected due to a fault, the network connection between the wireless bridge device and the second wireless access point may be disconnected. After the circuit connection is restored, the second wireless access point may again transmit an access packet to the wireless bridge device. At the moment, it is unnecessary to update the associated BSSID, and an access request may be directly transmitted to the second wireless access point to carry out a network connection with the second wireless access point. If they are not identical, subsequent updating processes may be continued.

At block S104, the wireless bridge device may determine whether the received access packet carries the configuration information of the second wireless access point, and block S105 may be executed if the configuration information is carried.

It is to be understood that in case that the BSSID carried in the received access packet is not matched with the locally-saved target BSSID, it may be continued determining whether the access packet carries the configuration information of the second wireless access point currently associated with the wireless bridge device.

There may be following two cases when it is determined that the access packet does not carry the configuration information of the second wireless access point. The first case is that the access packet does not carry any preset configuration information. At the moment, it may be regarded that the access packet may be transmitted by a wireless access point, for example, a wireless access point disposed in the same base station, wherein an SSID set up by the wireless access point is the same as that is set up by the second wireless access point currently associated with the wireless bridge device. It is to be understood that in practical application, to solve a problem of wireless signal coverage, generally more than one wireless access point (for example, three wireless access points) may be installed on the same base station, and an identical SSID may be set for the more than one wireless access point.

The other case is that the access packet may carry preset configuration information, but the preset configuration information is not matched with target configuration information locally saved in the wireless bridge device, namely, the preset configuration information is not matched with the configuration information of the second wireless access point currently associated with the wireless bridge device itself.

The wireless bridge device may discard the access packet when it is determined that the access packet does not carry the configuration information of the second wireless access point currently associated with the wireless bridge device itself.

Specifically, if the wireless access point transmitting the access packet is a wireless access point replacing a malfunctioning wireless access point, the access packet may carry preset configuration information indicating the malfunctioning wireless access point. For example, the preset configuration information may include the BSSID of the malfunctioning wireless access point. The determining whether the access packet carries configuration information of a second wireless access point currently associated with the wireless bridge device may include:

the wireless bridge device may determine whether the preset BSSID is identical to the target BSSID currently associated with the wireless bridge device;

the wireless bridge device may determine that the access packet may carry the configuration information if the preset BSSID is identical to the target BSSID; and the wireless bridge device may discard the access packet if the preset BSSID is not identical to the target BSSID.

It is to be understood that when the preset BSSID is identical to the target BSSID currently associated with the wireless bridge device, this may indicate that the preset BSSID is the BSSID of the second wireless access point and the first wireless access point is a wireless access point replacing the second wireless access point. If the preset BSSID is different from the target BSSID, this may indicate that the preset BSSID included in the preset configuration information of the first wireless access point is not the BSSID of the second wireless access point and thus the access packet may be discarded.

Since bits of the BSSID are more and the data amount is larger, directly comparing the preset BSSID may occupy a large number of resources of the wireless bridge device and waste time. To save time and resources and reduce a load pressure of the wireless bridge device, following manners may be further proposed.

In one example, the preset configuration information carried in the access packet transmitted by the first wireless access point may further include a preset source ID and a preset address ID.

Before the block of determining whether the preset BSSID is identical to the target BSSID currently associated with the wireless bridge device, the method of updating a BSSID provided by the examples of the present disclosure may further include the following block:

the wireless bridge device may determine whether the preset source ID and the preset address ID are respectively matched with a corresponding locally-saved target source ID and a target address ID;

the wireless bridge device may discard the access packet in case that either of the preset source ID and the preset address ID is not matched with the target source ID or the target address ID;

the wireless bridge device may execute the block of determining whether the preset BSSID is identical to the target BSSID currently associated with the wireless bridge device in case that the preset source ID and the preset address ID are respectively matched with the target source ID and the target address ID.

Before determining whether the preset BSSID carried in the received access packet is identical to the target BSSID currently associated with the wireless bridge device, the wireless bridge device may determine whether the preset source ID and the preset address ID in the access packet are respectively matched with the corresponding locally-saved target source ID and the target address ID. If they are not matched, the access packet may be discarded. If they are matched, the wireless bridge device may continue compare whether the preset BSSID is identical to the target BSSID for the access packet, and thereby may determine whether the access packet carries the configuration information of the second wireless access point currently associated with the wireless bridge device. A comparison data amount may be reduced by matching the preset source ID and the preset address ID and then comparing whether the preset BSSID is identical to the target BSSID. In this way, an effect of saving resources and time may be achieved.

In practical application, when an access packet is transmitted from a new wireless access point replacing a malfunctioning wireless access point, in addition to the SSID and the BSSID of the new wireless access point, the access packet may further carry information of the replaced malfunctioning wireless access point, namely, the preset configuration information. The preset source ID and the preset address ID recorded in the information (preset configuration information) of the malfunctioning wireless access point in the examples of the present disclosure respectively are a self-defined logo of a manufacturer of the malfunctioning wireless access point and the last three bytes of an MAC address (BSSID) of the malfunctioning wireless access point. The malfunctioning wireless access point may be the second wireless access point currently associated with the wireless bridge device. In practical application, the access packet generally may merely carry a piece of preset configuration information. Priority may be given to the first piece of preset configuration information if multiple pieces of preset configuration information are carried.

When it is determined that the access packet transmitted from the new wireless access point may carry the preset configuration information, first of all, an analysis may be conducted on contents in the field "identification" of the preset configuration information. Respectively "sz_logo" and "sz_mac" may be used to save the logo of the manufacturer of the wireless access point and the last three bytes of the MAC address (the preset BSSID) of the wireless access point. Then the "sz_logo" and the "sz_mac" may be compared with a target "sz_logo" (target source ID) and a target "sz_mac" (target address ID) in the configuration information of the second wireless access point currently associated which is saved in the wireless bridge device. The access packet carrying the preset configuration information may be discarded if either of the "sz_logo" and the "sz_mac" is not matched with the target "sz_logo" and the target "sz_mac". If they are matched successfully, it may be continued determining whether the preset BSSID is identical to the target BSSID currently associated with the wireless bridge device.

For example, the wireless bridge device may analyze that content of the field "identification" in the preset configuration information is "rrr233456", wherein the "sz_logo" may be "rrr", and the "sz_mac" may be "233456"; and the wireless bridge device may analyze that the preset BSSID carried in the preset configuration information may be 08:00:12:23:34:56. The target BSSID saved in the wireless bridge device may be 08:00:12:23:34:56, the target source ID may be "rrr", and the target address ID may be "233456". First of all, the "sz_logo" may be compared with the target source ID and the "sz_mac" may be compared with the target address ID, and it may be determined that they are successfully matched. Afterward, it may be continued comparing the preset BSSID with the target BSSID, and it may be determined that they are successfully matched. Therefore, it may be determined that the preset configuration information carried in the access packet may be the configuration information of the second wireless access point currently associated with the wireless bridge device. Of course it is to be understood that when the "sz_logo" is compared with the target source ID and the "sz_mac" is compared with the target address ID, if either group is not matched, the corresponding access packet may be directly discarded, and a subsequent comparison between the preset BSSID and the target BSSID may be not made any more.

At block S105, the wireless bridge device may save the BSSID carried in the access packet as the target BSSID.

It is to be noted that when it is determined that the access packet may carry the configuration information of the second wireless access point associated with the wireless bridge device, the wireless bridge device may save the BSSID of the first wireless access point carried in the access packet as the target BSSID.

By applying the examples of the present disclosure, first of all, the wireless bridge device may determine whether the SSID carried in the received access packet transmitted by the first wireless access point is matched with the locally-saved target SSID, namely, the target SSID of the second wireless access point currently associated with the wireless bridge device. If the SSID carried in the received access packet is matched with the locally-saved target SSID, it may be continued determining whether the BSSID carried in the access packet is identical to the locally-saved target BSSID, namely, the target BSSID of the second wireless access point. If the BSSID carried in the access packet is different from the locally-saved target BSSID, it may be determined whether the access packet may carry the configuration information of the second wireless access point. If the access packet carries the configuration information, the BSSID carried in the access packet may be saved as the target BSSID. In this way, it may be implemented that manual intervention may be needless, an associated BSSID may be automatically updated, and maintenance workload may be reduced for management staff.

In one example, before receiving the access packet transmitted by the first wireless access point, the method may further include disconnecting a network connection between the wireless bridge device and the second wireless access point. Wherein when information transmitted by the second wireless access point is not received within a preset time span, this may indicate that the wireless bridge device is disconnected from the second wireless access point.

It is to be understood that the wireless bridge device may not receive any access packet any more after being associated with a wireless access point and establishing a network connection therewith, and may not receive any access packet unless the network connection is disconnected from the wireless access point. When information transmitted by the second wireless access point is not received within preset time, this may indicate that the wireless bridge device is disconnected from the second wireless access point. In practical application, the information may have multiple forms, which may be an access packet transmitted by the second wireless access point or may be network data information. Of course the network data information also may be transmitted to the wireless bridge device in the form of a packet, which is different from the access packet, etc.

In another example, to save local resources of the wireless bridge device and reduce load pressure for the wireless bridge device, the wireless bridge device may discard the access packet that does not carry the configuration information of the second wireless access point currently associated with the wireless bridge device. Specifically, when it is determined that the access packet does not carry the configuration information of the second wireless access point currently associated with the wireless bridge device, the method may further include discarding the access packet, wherein discarding the access packet may adopt the prior art, which is not unnecessarily described herein.

Figure 2:
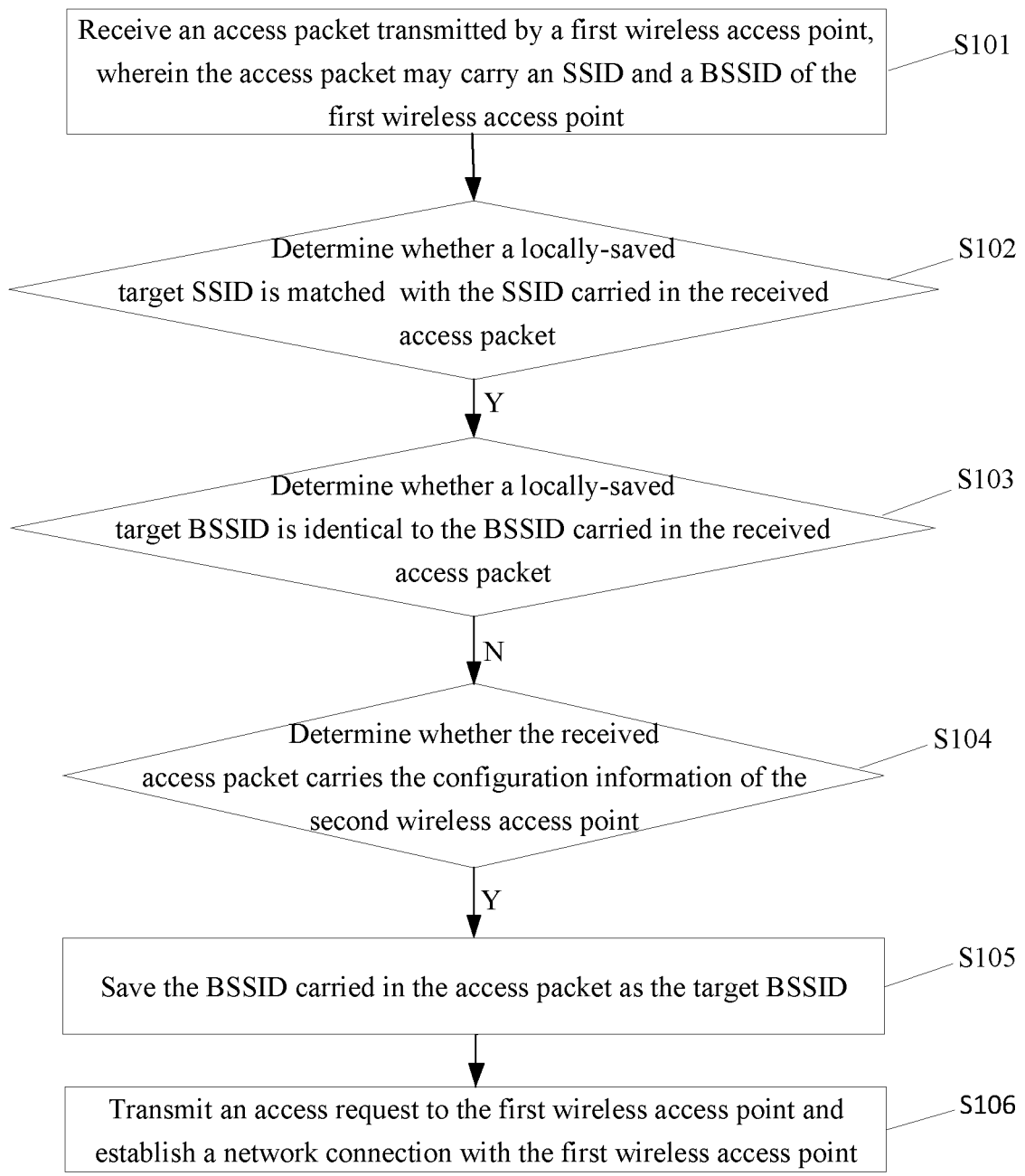
FIG. 2 is a schematic flow diagram of a method of connecting a network according to examples of the present disclosure.

In one aspect, as shown in FIG. 2, the examples of the present disclosure further provide a method of connecting a network, which may be applied to a wireless bridge device. After the BSSID of the first wireless access point carried in the access packet is saved as the target BSSID (S105) according to the method of updating a BSSID based on the blocks S101~S105, following blocks may be included.

At block S106, the wireless bridge device may transmit an access request to the first wireless access point and establish a network connection with the first wireless access point.

After updating the target BSSID based on the blocks S101~S105, the wireless bridge device may transmit the access request to the first wireless access point. After receiving the access request, the first wireless access point may permit the wireless bridge device to establish a network connection with itself (the first wireless access point). By applying the examples of the present disclosure, network services may be more quickly provided for a wireless bridge device having established a network connection with a malfunctioning wireless access point.

Figure 3:
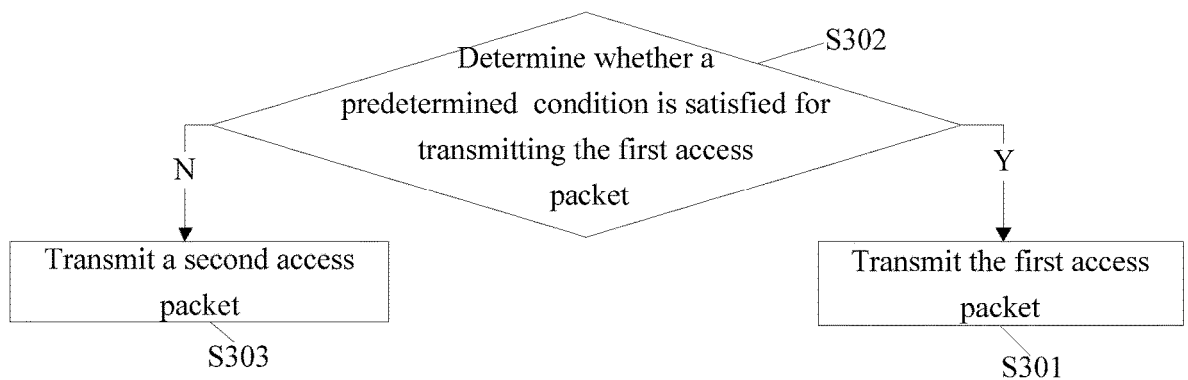
FIG. 3 is another schematic flow diagram of a method of updating a BSSID according to examples of the present disclosure.

In one aspect, as shown in FIG. 3, the examples of the present disclosure further provide a method of updating a BSSID, which may be applied to a first wireless access point that is a new wireless access point replacing a malfunctioning wireless access point, wherein the method may include following blocks.

At block S301, the first wireless access point may transmit a first access packet carrying an SSID, a BSSID and preset configuration information of the first wireless access point. After receiving the first access packet, the wireless bridge device may determine whether to update the BSSID of the locally-associated second wireless access point according to the first access packet.

It is to be understood that the wireless bridge device may determine whether to update the BSSID of the locally-associated wireless access point according to the received first access packet. The first access packet may carry the SSID, the BSSID and the preset configuration information of the first wireless access point, so that the wireless bridge device may determine, according to the preset configuration information, whether the first wireless access point is a new wireless access point replacing the currently associated wireless access point, and hereby determine whether to update the BSSID (target BSSID) of the locally-associated second wireless access point.

By applying the examples of the present disclosure, the first wireless access point may transmit a first access packet carrying the SSID, the BSSID and the preset configuration information of the first wireless access point, so that the wireless bridge device may determine whether to update the BSSID of the locally-associated second wireless access point according to the first access packet. In this way, it may be implemented to automatically update an associated BSSID by the wireless bridge device without manual intervention, thereby achieving the objective of saving time and energy.

Figure 4:
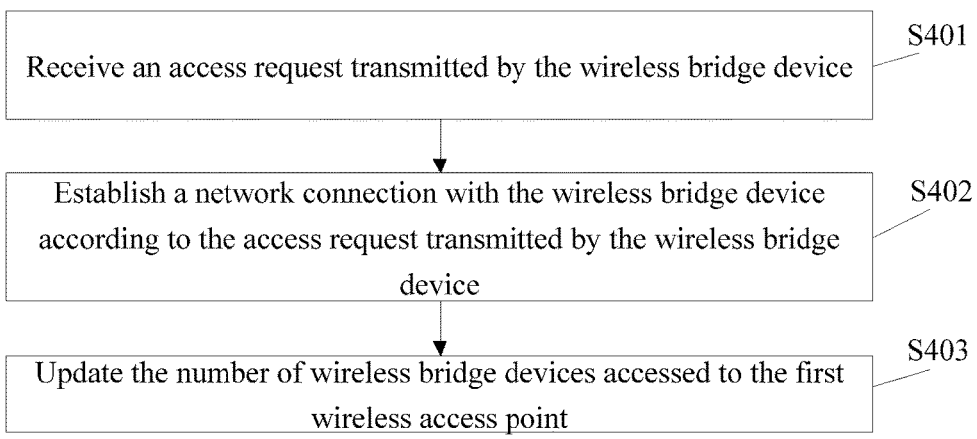
FIG. 4 is still another schematic flow diagram of a method of updating a BSSID according to examples of the present disclosure.

Specifically, as shown in FIG. 4, based on block S301, the examples of the present disclosure may further provide a method of updating a BSSID, which may include following blocks.

At block S401, the first wireless access point may receive an access request transmitted by the wireless bridge device.

At block S402, the first wireless access point may establish a network connection with the wireless bridge device according to the access request transmitted by the wireless bridge device.

At block S403, the first wireless access point may update the number of wireless bridge devices accessed to the first wireless access point.

It is to be noted that when determining that the currently-associated wireless access point is to be replaced according to the first access packet transmitted by the first wireless access point, the wireless bridge device may update the locally-associated (saved) target BSSID to be the BSSID of the first wireless access point carried in the first access packet. Meanwhile, the wireless bridge device may transmit an access request to the first wireless access point, and the first wireless access point may establish a network connection with the wireless bridge device according to the access request. To make it convenient for the first wireless access point to determine whether the first access packet may be transmitted, after establishing a network connection with the wireless bridge device, the first wireless access point may update the number of wireless bridge devices accessed to the first wireless access point. By limiting the number of wireless bridge devices accessed to the first wireless access point, it is avoidable that the performance of the first wireless access point may be affected by an excessive number of wireless bridge devices accessed to the first wireless access point.

Specifically, the first access packet carrying the preset configuration information may be different from a second access packet not carrying the preset configuration information. The first access packet carrying the preset configuration information may be sent out by a new wireless access point replacing a malfunctioning wireless access point under certain condition. However, the second access packet may be sent out by any wireless access point, which may include the new wireless access point. Specifically, as shown in FIG. 3, before the block S301 of transmitting a first access packet, the method of updating a BSSID provided the examples of the present disclosure may further include following blocks.

At block S302, the first wireless access point may determine whether a predetermined condition is satisfied for transmitting the first access packet, and may execute block S301 if the predetermined condition is satisfied. Wherein the predetermined condition may include: the number of wireless bridge devices accessed to the first wireless access point does not reach a preset target number, and/or a duration of time from configuration of the first wireless access point taking effect to transmitting the first access packet by the first wireless access point does not exceed a preset duration of time.

After the configuration of the first wireless access point is completed, first of all, the first wireless access point may determine whether itself satisfies the predetermined condition for transmitting the first access packet, and transmit the first access packet if it satisfies the predetermined condition, or transmit the second access packet if it does not satisfy the predetermined condition. The predetermined condition may be set up in advance.

It is to be noted that the first access packet may be transmitted by broadcast when the number of wireless bridge devices accessed to the first wireless access point does not reach the preset target number. Alternatively, the first access packet may be transmitted when a duration of time from configuration of the first wireless access point taking effect to transmitting the first access packet does not exceed the preset duration of time. In case that both the preset target number and the preset duration of time are set up, the first wireless access point may not transmit the first access packet any more if the preset duration of time elapses, and the number of wireless bridge devices accessed to the first wireless access point does not reach the preset target number. At the moment, the predetermined condition may be reset for the first wireless access point, or wireless bridge devices not accessed to the first wireless access point may be accessed to the first wireless access point manually. In addition, if the number of wireless bridge devices accessed to the first wireless access point reaches the preset target number within the preset duration of time, the first wireless access point may not transmit the first access packet any more, or may continue transmitting the first access packet and not stop transmitting the first access packet until the preset duration of time.

Specifically, to timely detect whether the first wireless access point satisfies the predetermined condition, the first wireless access point may be intelligently controlled to transmit the first access packet. The method of updating a BSSID provided by the examples of the present disclosure may further include updating the number of wireless bridge devices accessed to the first wireless access point after a network connection is established between the wireless bridge device and the first wireless access point.

Specifically, as shown in FIG. 3, when it is determined that the predetermined condition is not satisfied for transmitting the first access packet, the method of updating a BSSID provided the examples of the present disclosure may further include following blocks.

At block S303, the first wireless access point may transmit a second access packet carrying an SSID and a BSSID of the first wireless access point.

It is to be noted that when the predetermined condition is not satisfied for transmitting the first access packet, theoretically this may indicate that the preset target number of wireless bridge devices have been accessed to the first wireless access point, and thus no wireless bridge device may be expected to be accessed to the first wireless access point. At the moment, the first wireless access point may continue transmitting the second access packet only carrying its own SSID and BSSID. In practical application, when the wireless bridge device is disconnected from the currently-associated wireless access point for normal reasons such as power outage, a network connection may be reestablished by means of the second access packet.

Figure 5:
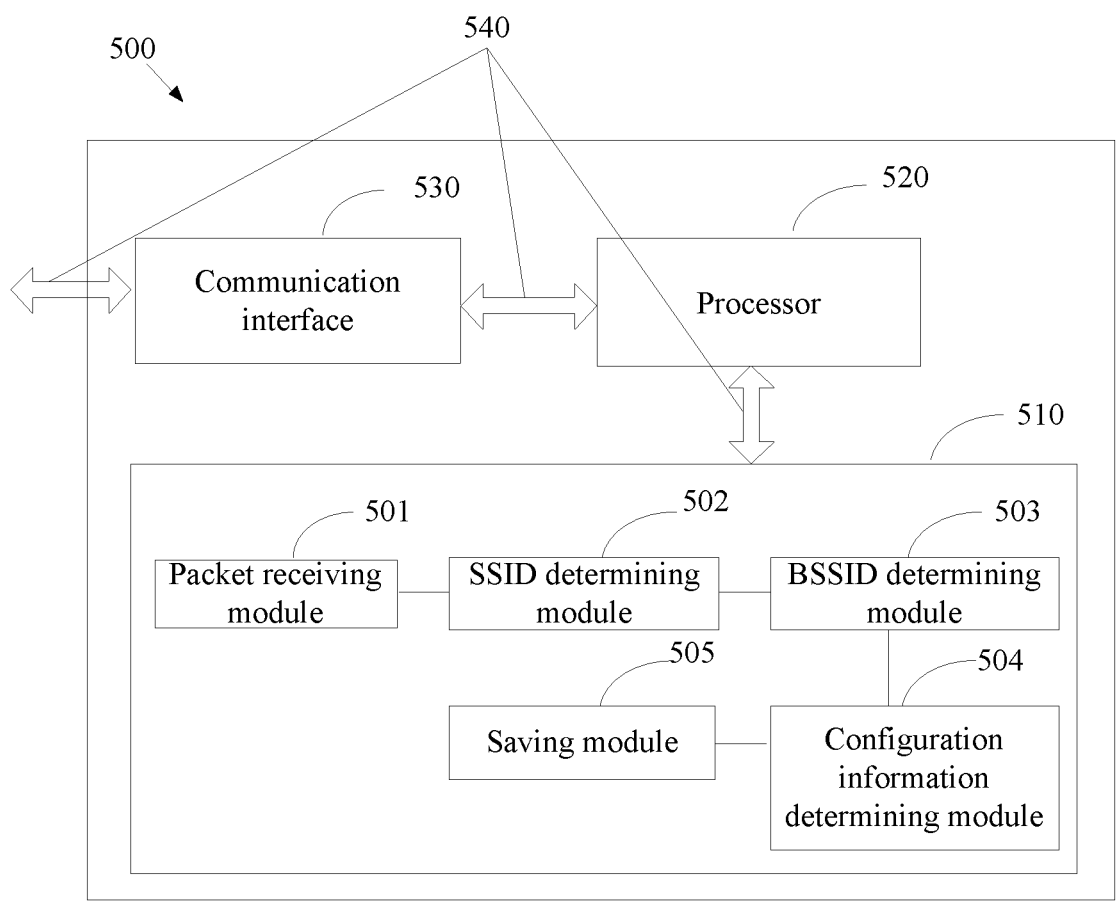
FIG. 5 is a schematic structural diagram of a wireless bridge device according to examples of the present disclosure.

In one aspect, corresponding to the above method examples, the examples of the present disclosure may further provide a wireless bridge device, as shown in FIG. 5, the wireless bridge device 500 may include: a storage medium 510, a processor 520, a communication interface 530, and a coupling mechanism 540 coupling the storage medium 510, the processor 520 and the communication interface 530 together. The storage medium 510 may store a plurality of machine readable instruction modules executed by the processor 520. The machine readable instruction modules may include: a packet receiving module 501, an SSID determining module 502, a BSSID determining module 503, a configuration information determining module 504 and a saving module 505.

The packet receiving module 501 may be configured to receive an access packet transmitted by a first wireless access point, wherein the access packet may carry an SSID and a BSSID of the first wireless access point.

The SSID determining module 502 may be configured to determine whether a target SSID locally saved in the wireless bridge device is matched with the SSID carried in the access packet, and trigger the BSSID determining module 503 if the target SSID is matched with the SSID.

The BSSID determining module 503 may be configured to determine whether the locally-saved target BSSID is identical to the BSSID carried in the access packet, and trigger the configuration information determining module 504 if they are different.

The configuration information determining module 504 may be configured to determine whether the access packet carries configuration information of a second wireless access point currently associated with the wireless bridge device, and trigger the saving module 505 if the access packet carries the configuration information.

The saving module 505 may be configured to save the BSSID carried in the access packet as the target BSSID and transmit an access request to establish a network connection with the first wireless access point.

By applying the examples of the present disclosure, first of all, the wireless bridge device may determine whether the SSID carried in the received access packet transmitted by the first wireless access point is matched with the locally-saved target SSID. If they are matched, the wireless bridge device may continue determining whether the BSSID carried in the access packet is identical to the locally-saved target BSSID. If they are different, the wireless bridge device may determine whether the access packet carries configuration information of a second wireless access point currently associated with the wireless bridge device. If the access packet carries the configuration information, the BSSID carried in the access packet may be saved as the target BSSID. In this way, it may be implemented that manual intervention may be needless, an associated BSSID may be automatically updated, and maintenance workload may be reduced.

In an example, the machine readable instruction modules may further include a packet discarding module.

The packet discarding module may be configured to discard the access packet in case that the access packet does not carry the configuration information of the second wireless access point currently associated with the wireless bridge device.

In an example, the access packet may carry preset configuration information, which may include a preset BSSID.

The configuration information determining module may include a BSSID determining unit and a first discarding unit.

The BSSID determining unit may be configured to determine whether the preset BSSID is identical to the target BSSID currently associated with the wireless bridge device, and trigger the saving module 505 if they are identical, or trigger the first discarding unit if they are different.

The first discarding unit may be configured to discard the access packet.

In one example, the access packet may carry preset configuration information, which may further include a preset source ID and a preset address ID.

The configuration information determining module may further include a matching unit and a second discarding unit.

The matching unit may be configured to determine whether the preset source ID and the preset address ID are respectively matched with a corresponding locally-saved target source ID and a target address ID. The BSSID determining unit may be triggered if they are matched; or the second discarding unit may be triggered if they are not matched.

The second discarding unit may be configured to discard the access packet.

Figure 6:
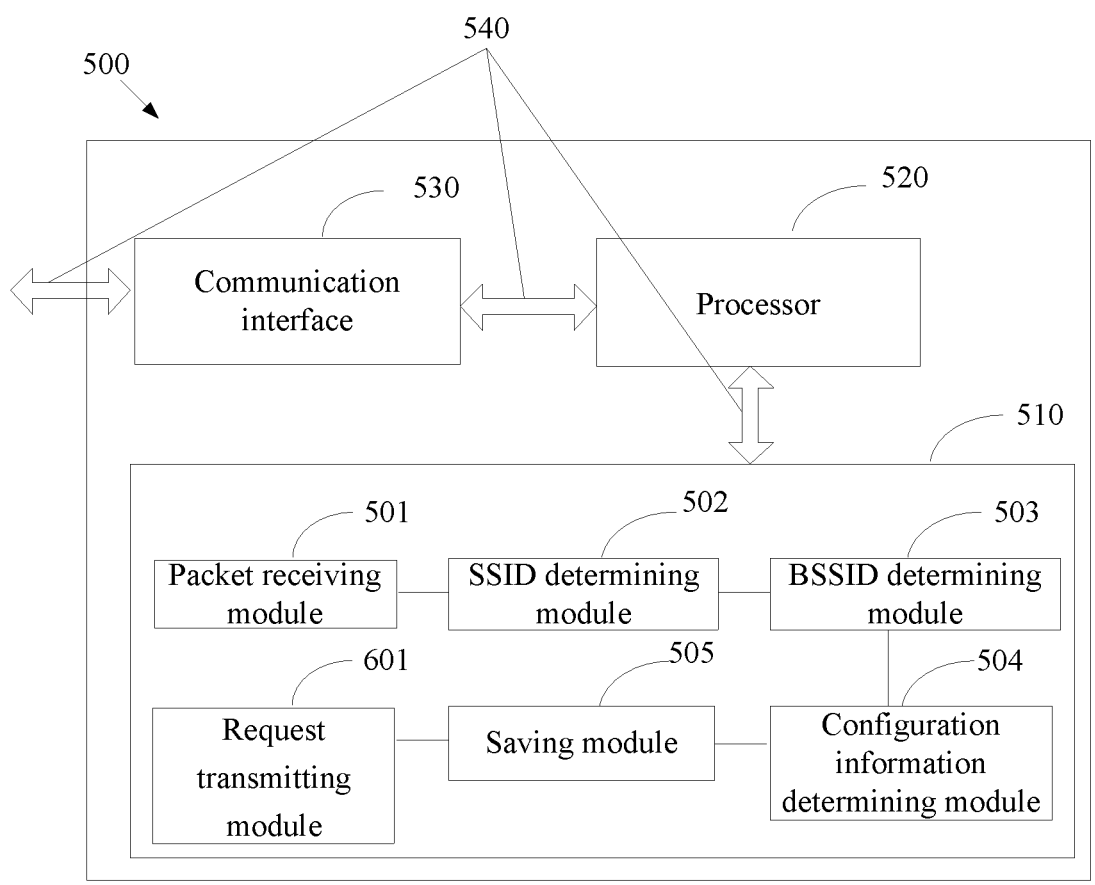
FIG. 6 is a schematic structural diagram of a wireless bridge device according to examples of the present disclosure.

In one aspect, as shown in FIG. 6, the instruction modules may further include a request transmitting module 601.

The request transmitting module 601 may be configured to transmit an access request to the first wireless access point and establish a network connection with the first wireless access point.

Figure 7:
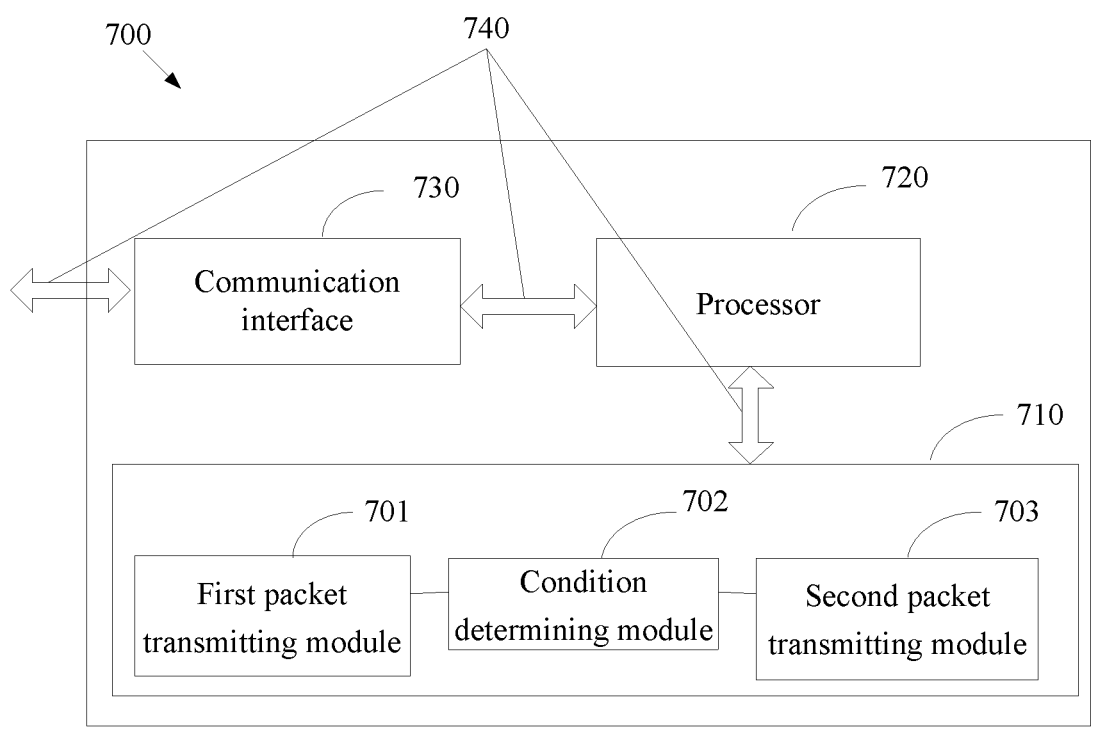
FIG. 7 is a schematic structural diagram of a wireless access point according to examples of the present disclosure.

In one aspect, the examples of the present disclosure may further provide a first wireless access point, as shown in FIG. 7, the first wireless access point 700 may include: a storage medium 710, a processor 720, a communication interface 730, and a coupling mechanism 740 coupling the storage medium 710, the processor 720 and the communication interface 730 together. The storage medium 710 may store a plurality of machine readable instruction modules executed by the processor 720. The machine readable instruction modules may include a first packet transmitting module 701, a condition determining module 702 and a second packet transmitting module 703.

The first packet transmitting module 701 may be configured to transmit the first access packet carrying an SSID, a BSSID and preset configuration information of the first wireless access point, so that the wireless bridge device may determine, after receiving the first access packet, whether to update a BSSID of a second wireless access point associated with the wireless bridge device according to the first access packet.

The condition determining module 702 may be configured to determine whether a predetermined condition is satisfied for transmitting the first access packet, and trigger the first packet transmitting module 701 if the predetermined condition is satisfied. Wherein the predetermined condition may include: the number of wireless bridge devices accessed to the first wireless access point does not reach a preset target number, and/or a duration of time from configuration of the first wireless access point taking effect to transmitting the first access packet does not exceed a preset duration of time.

The second packet transmitting module 703 may be configured to transmit a second access packet carrying an SSID and a BSSID of the first wireless access point.

By applying the examples of the present disclosure, the first wireless access point may transmit a first access packet carrying the SSID, the BSSID and the preset configuration information of the first wireless access point, so that the wireless bridge device may determine whether to update the BSSID of the second wireless access point associated with the wireless bridge device according to the first access packet. In this way, it may be implemented to automatically update an associated BSSID by the wireless bridge device without manual intervention, thereby achieving the objective of saving time and energy.

Figure 8:
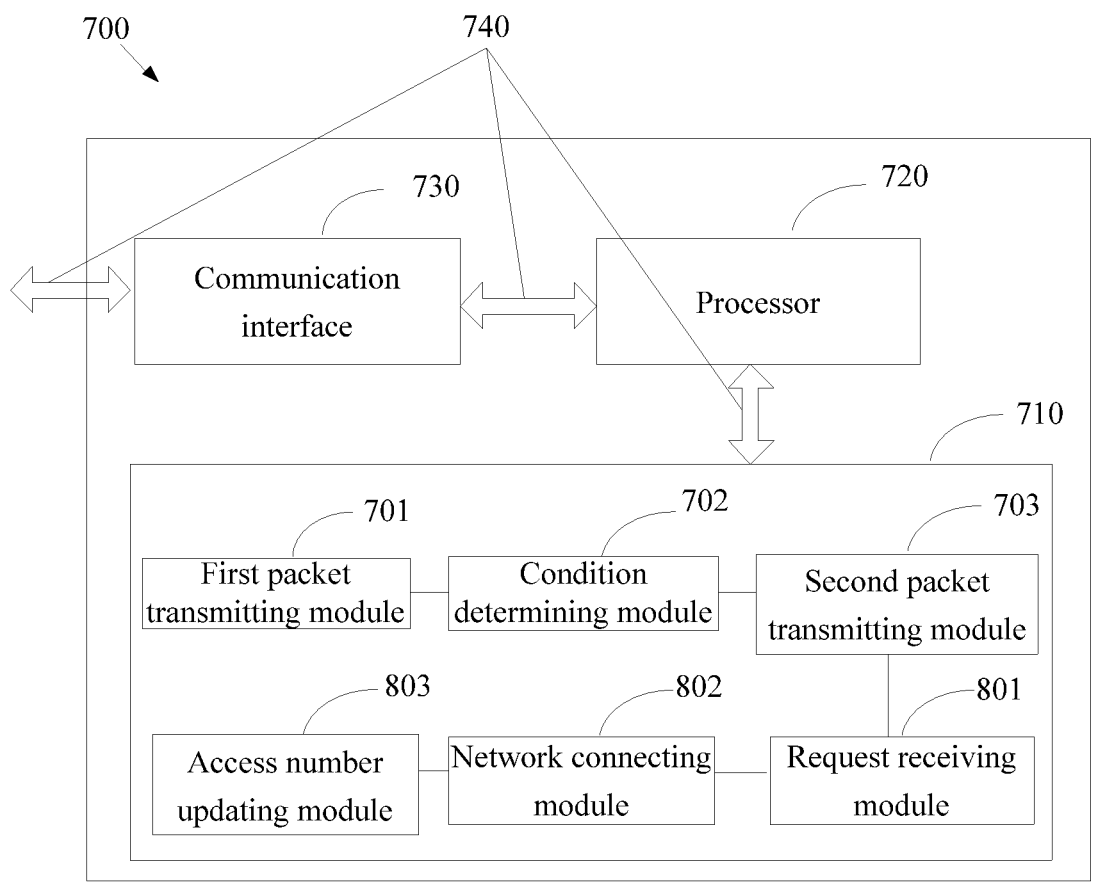
FIG. 8 is another schematic structural diagram of a wireless access point according to examples of the present disclosure.

As shown in FIG. 8, the machine readable instruction modules may further include a request receiving module 801, a network connecting module 802 and an access number updating module 803.

The request receiving module 801 may be configured to receive an access request transmitted by the wireless bridge device.

The network connecting module 802 may be configured to establish a network connection with the wireless bridge device according to the access request transmitted by the wireless bridge device.

The access number updating module 803 may be configured to update the number of wireless bridge devices accessed to the first wireless access point.

Because system/apparatus examples may be basically similar to the method examples, the description of the system/apparatus examples may be simple, and reference may be made to the description of the method examples for relevant parts.

Apparently, the examples set forth above are merely some but not all of the examples of the present disclosure. All other examples obtained by persons of ordinary skill in the art based on the examples of the present disclosure without creative efforts shall fall within the protection scope of the present disclosure.

It is to be noted that a relational term such as a "first" or a "second" herein is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "may include a" do not exclude the fact that additional identical elements may exist in a process, a method, a merchandise or a device of these elements.

It should be understood for those of ordinary skill in the art that a part of or the whole of blocks in the above method examples may be implemented by programs instructing related hardware. The programs may be stored in a computer readable storage medium such as ROM/RAM, a magnetic disc, an optical disc or the like.

The above are merely examples of the present disclosure, and are not intended to limit the scope of protection of the present disclosure. All modifications, equivalent substitutions and improvements made within the spirit and principle of the present disclosure shall fall within the protection scope of the present disclosure.

The invention claimed is:

1. A method of updating a basic service set identifier (BSSID), comprising:
receiving, by a wireless bridge device, an access packet transmitted by a first wireless access point, wherein the access packet carries a service set identifier (SSID), a BSSID of the first wireless access point, and preset configuration information which comprises a preset BSSID, a preset source ID, and a preset address ID;

in case that a target SSID locally saved in the wireless bridge device matches with the SSID carried in the access packet, determining, by the wireless bridge device, whether a target BSSID locally saved in the wireless bridge device is identical to the BSSID carried in the access packet;

in case that the target BSSID is different from the BSSID carried in the access packet, determining, by the wireless bridge device, whether the access packet carries configuration information of a second wireless access point currently associated with the wireless bridge device;

in case that the access packet carries the configuration information, saving, by the wireless bridge device, the BSSID of the first wireless access point carried in the access packet as the target BSSID, wherein determining whether the access packet carries the configuration information of the second wireless access point currently associated with the wireless bridge device comprises:

determining, by the wireless bridge device, whether the preset BSSID is identical to the target BSSID currently associated with the wireless bridge device;

determining, by the wireless bridge device, that the access packet carries configuration information when the preset BSSID is identical to the target BSSID; and discarding, by the wireless bridge device, the access packet when the preset BSSID is different from the target BSSID;

wherein, before determining whether the preset BSSID is identical to the target BSSID currently associated with the wireless bridge device, the method further comprises:

determining, by the wireless bridge device, whether the preset source ID and the preset address ID match with a corresponding target source ID and a target address ID which are locally stored in the wireless bridge device, respectively;

discarding, by the wireless bridge device, the access packet when either of the preset source ID and the preset address ID does not match with one of the target source ID and the target address ID; and determining, by the wireless bridge device, whether the preset BSSID is identical to the target BSSID currently associated with the wireless bridge device when the preset source ID and the preset address ID match with the target source ID and the target address ID, respectively.

2. The method according to claim 1, further comprising: discarding, by the wireless bridge device, the access packet in case that the access packet does not carry the configuration information.

3. A method of updating a basic service set identifier (BSSID), comprising:

transmitting, by a first wireless access point, a first access packet, wherein the first access packet carries a service set identifier (SSID), a BSSID, and preset configuration information of the first wireless access point, wherein the preset configuration information comprises a preset BSSID, wherein, before transmitting the first access packet, the method further comprises:

determining, by the first wireless access point, whether a predetermined condition is satisfied for transmitting the first access packet, wherein the predetermined condition comprises either one of:

a number of wireless bridge devices accessed by the first wireless access point does not reach a preset target number, and a duration of time from configuration of the first wireless access point taking effect until transmitting the first access packet does not exceed a preset duration of time;

transmitting, by the first wireless access point, the first access packet when the predetermined condition is satisfied; and causing a wireless bridge device having received the first access packet to determine whether to update a BSSID of a second wireless access point associated with the wireless bridge device according to the first access packet.

4. The method according to claim 3, further comprising:

establishing, by the first wireless access point, a network connection with the wireless bridge device according to an access request transmitted by the wireless bridge device; and updating, by the first wireless access point, the number of wireless bridge devices accessed by the first wireless access point.

5. The method according to claim 3, further comprising:

transmitting, by the first wireless access point, a second access packet carrying the SSID and the BSSID of the first wireless access point when the predetermined condition is not satisfied.

6. A wireless bridge device, comprising:

a processor; and a non-transitory storage medium storing machine-executable instructions, wherein, by executing the machine-executable instructions, the processor is caused to:

receive an access packet transmitted by a first wireless access point, wherein the access packet carries a service set identifier (SSID), a basic service set identifier (BSSID) of the first wireless access point, and preset configuration information which comprises a preset BSSID, a preset source ID, and a preset address ID;

in case that a target SSID locally saved in the wireless bridge device matches with the SSID carried in the access packet, determine whether a target BSSID locally saved in the wireless bridge device is identical to the BSSID carried in the access packet;

in case that the target BSSID is different from the BSSID carried in the access packet, determine whether the access packet carries configuration information of a second wireless access point currently associated with the wireless bridge device;

in case that the access packet carries the configuration information, save the BSSID of the first wireless access point carried in the access packet as the target BSSID; and when determining whether the access packet carries the configuration information of the second wireless access point, determine whether the preset BSSID is identical to the target BSSID currently associated with the wireless bridge device;

determine that the access packet carries configuration information when the preset BSSID is identical to the target BSSID; and discard the access packet when the preset BSSID is different from the target BSSID;

wherein, before determining whether the preset BSSID is identical to the target BSSID currently associated with the wireless bridge device, the method further comprises:

determining, by the wireless bridge device, whether the preset source ID and the preset address ID match with a corresponding target source ID and a target address ID which are locally stored in the wireless bridge device, respectively;

discarding, by the wireless bridge device, the access packet when either of the preset source ID and the preset address ID does not match with one of the target source ID and the target address ID; and determining, by the wireless bridge device, whether the preset BSSID is identical to the target BSSID currently associated with the wireless bridge device when the preset source ID and the preset address ID match with the target source ID and the target address ID, respectively.

7. The wireless bridge device according to claim 6, wherein the machine-executable instructions further cause the processor to:

discard the access packet in case that the access packet does not carry the configuration information.

* * * * *